June 29, 1965  R. S. JACOBSON  3,191,302
STRAWBERRY PICKING THIMBLES
Filed Jan. 13, 1964
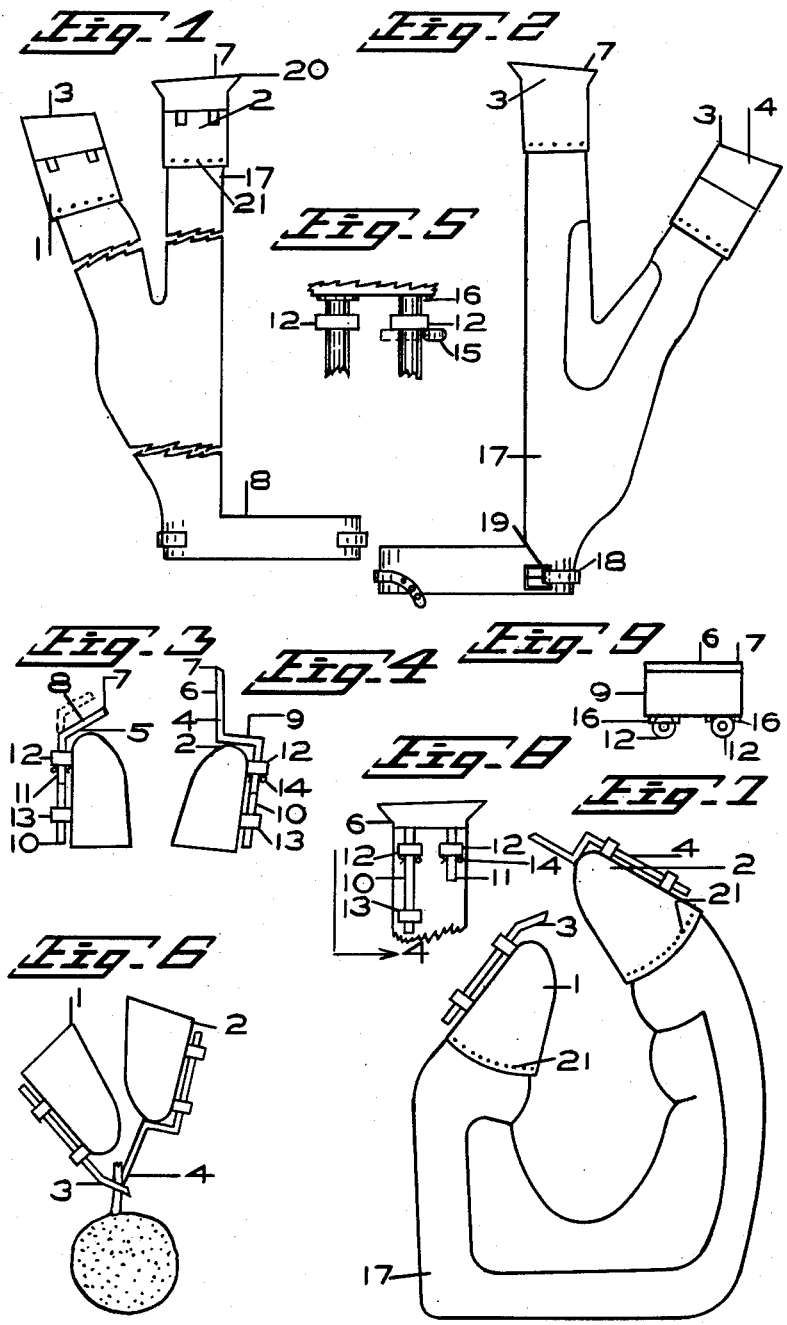

3,191,302
STRAWBERRY PICKING THIMBLES
Ralph Spencer Jacobson, 2448 240th St.,
Langley, British Columbia, Canada
Filed Jan. 13, 1964, Ser. No. 337,330
2 Claims. (Cl. 30—298)

This invention relates to strawberry picking devices, having particular reference to thimbles for attachment on the thumb and forefinger of the picker and improved blades on the thimbles.

In the art to which the invention relates, in picking strawberries the thumb and forefinger of the picker become stained and sore, and they are subjected to fine stones, sand and dirt lodging in the tips and under the nails, and to thorns and thistles and other injurious foreign matter. In addition the thumb and finger nails wear down and in some instances become torn, hampering the picker.

The present device is designed to overcome this by the use of thimbles to be worn on the thumb and forefinger, the thimbles having blades attached thereon with cutting edges for severing the strawberry stems. There is further shown a fabric glove fragment on which the thimbles may be attached.

In the drawings, wherein is illustrated a preferred embodiment of the invention, FIG. 1 shows a back view of a glove fragment for the thumb and forefinger, and on which the blade holding thimbles are attached with blades mounted thereon, the shanks of the blades being shown broken away and the lugs omitted.

FIG. 2 shows a front view of the showing in FIGURE 1.

FIG. 3 is a side view of a thimble with a cutting blade attached, and adapted for use on the thumb of the picker.

FIG. 4 is a side view of a thimble with cutting blade for use on the forefinger.

FIG. 5 shows a side perspective of fragments of the blade shanks and with a cotter pin engaging both shanks.

FIG. 6 shows a side view of a pair of thimbles with attached cutting blades, shown as they would appear in contact with the stem of a strawberry.

FIG. 7 is a side view of a portion of a hand and glove fragment with thimbles and cutting blades mounted on the thumb and forefinger.

FIG. 8 is a back view of a blade for the forefinger shown in attachment to a thimble, with the latter broken away.

FIG. 9 is an outer end view of a blade for use on the forefinger, and including a washer on one of the shank engaging lugs.

Having reference to the drawings, thimbles 1 and 2 are designed to be worn on the forefinger and thumb of the picker, these thimbles being preferably of metal, or a nylon or like material capable of carrying cutting blades 3 and 4, and of protecting the wearer.

The cutting blades include flat blade portions 5 and 6 (FIGS. 3, 4 and 8) with cutting edges 7, the blades being for the thumb and forefinger respectively. The blades are integral, or integrally fixed, on base portions 8 and 9 from which project shanks 10 and 11 to be engaged in lugs 12 on the thimbles, the end of the shank 10 engaging a further lug 13 on the thimbles. The shanks may be secured by cotter pins 14 (FIG. 8) or a single cotter pin 15 (FIG. 5) may be used engaging both shanks. The lugs 12 have preferably base portions 16 by which washers 16' may be interposed, if required, between the shanks and thimbles.

The base portion 8 of the thumb cutting blade angles inwardly from its shank, inclined at about forty five degrees therefrom, to bring the cutting blade inclined over the end of the thumb; and the base portion of the forefinger extends at right angles to its shank with the blade 4 at right angles to the base portion.

The thimbles are attachable, as by a line of stitching 21 (FIG. 7) for each thimble, to a glove fragment 17 that may be secured by a strap 18 encircling the wrist and engaged with a buckle 19.

In addition, the blade 6 for the forefinger may have its ends widened (as at 20 in FIGURE 8), to make it the same width as the blade for the thumb in respect to its cutting edge 7.

In the use of the device, in FIGURE 7 the cutting blades are shown in position to engage a strawberry stem therebetween, the view in FIGURE 6 showing the blades brought into contact with the stem. In this the thumb blade is held against the stem and pressure is put on the forefinger blade to nip the stem. The glove fragment provides protection to the user, and also serves to hold the thimbles in place and provide an inner pad for the thimbles.

I claim:
1. An attachment for picking strawberries comprising thimbles to be worn one each on the thumb and forefinger of the user, and including blades on the thimbles, in which the blades have straight cutting edges and are attached on the outer sides of the thimbles, with the blade on the forefinger extending forwardly of the finger and having its cutting edge aligned centrally and transversely of the finger end, and with the blade on the thumb inclining forwardly inward and having its cutting edge aligned centrally and transversely of the thumb end, and by which said cutting edges may be brought together in opposing relation to each other for engaging a strawberry stem therebetween and cutting the stem by pressure on the opposing blades towards each other.

2. An attachment for picking strawberries comprising two thimbles to be worn one each on the thumb and forefinger of the user, and including blades on the thimbles, in which the blades have straight cutting edges and include shank portions, means attaching the shank portions of the blades on the outer sides of the thimbles, the blade on the forefinger thimble having a base portion extending partially across the outer end of the thimble and a blade portion at right angles thereto, said blade portion having a cutting edge aligned centrally of the end of the thimble, and the blade on the thumb having a base portion extending forwardly of the thimble and a blade portion including forwardly inward, said blade portions being adapted to be brought together to engage a strawberry stem having the cutting edges thereof.

References Cited by the Examiner
UNITED STATES PATENTS

| D. 163,769 | 6/51 | Robinson | 30—298 X |
|---|---|---|---|
| 666,666 | 1/01 | Hackett | 30—175 |
| 885,569 | 4/08 | Bergquist | 30—298 |
| 971,186 | 9/10 | Freitag | 30—298 |
| 1,891,688 | 12/32 | Parker et al. | 30—232 |

WILLIAM FELDMAN, *Primary Examiner.*